United States Patent

Sitter

[11] Patent Number: 5,161,056
[45] Date of Patent: Nov. 3, 1992

[54] REFLECTOR-ORNAMENT HOLDER FOR VEHICLE WHEELS

[76] Inventor: Matthew J. Sitter, P.O. Box 657, Shreveport, La. 71119

[21] Appl. No.: 559,404

[22] Filed: Jul. 26, 1990

Related U.S. Application Data

[63] Continuation-in-part of Ser. No. 260,316, Oct. 20, 1988, abandoned.

[51] Int. Cl.$^5$ .............................................. G02B 5/12
[52] U.S. Cl. ...................................... 359/533; 359/524
[58] Field of Search ................ 350/97, 99; 250/458.1, 250/462.1, 466.1; 138/89.1–89.4; 152/427, 428, 431, DIG. 7, 11, 13; 359/520, 522, 524, 533

[56] References Cited

U.S. PATENT DOCUMENTS 2,382,832  8/1945  Thornton .............................. 350/99

Primary Examiner—Bruce Y. Arnold
Assistant Examiner—James Phan
Attorney, Agent, or Firm—Rod Bryant Jordan

[57] ABSTRACT

An apparatus for mounting visual images or image producing devices onto the valve stems of inflatable tires, and more specifically, a valve stem mounted reflector having a lens, a reflective element and a forcible removable system of mounting.

9 Claims, 2 Drawing Sheets

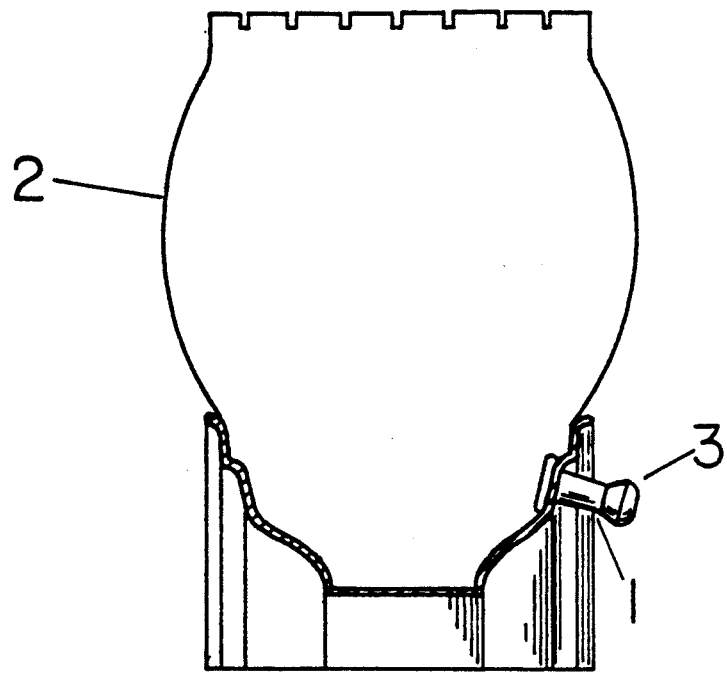
FIGURE 1
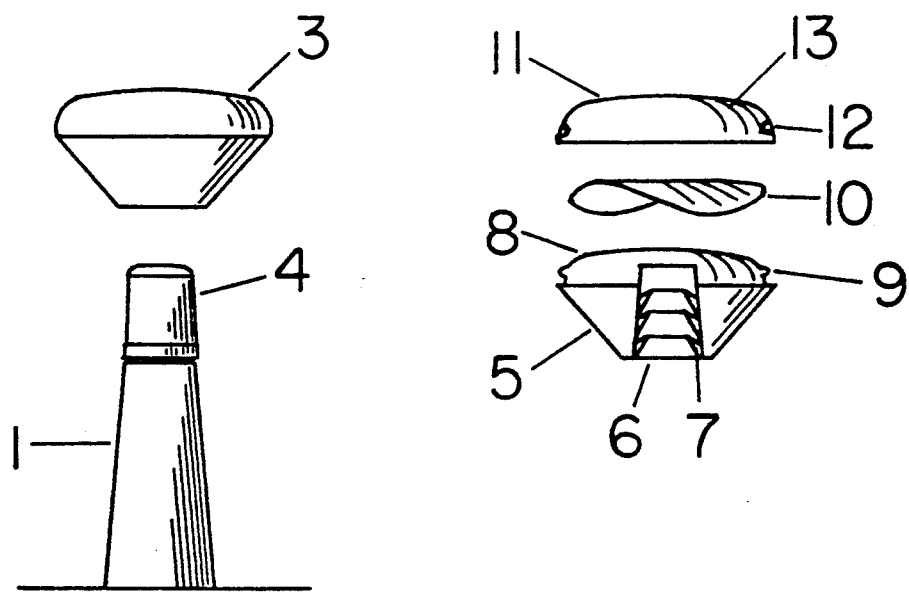
FIGURE 2
FIGURE 3

REFLECTOR-ORNAMENT HOLDER FOR VEHICLE WHEELS

BACKGROUND OF THE INVENTION

This application is a continuation-in-part of the patent application "Signal Ornament for Vehicle Wheels", Ser. No. 07/260,316, filed on Oct. 20, 1988, by Matthew J. Sitter, of 6009 Land-O-Trees, Shreveport, La. 71119, now abandoned. The invention described herein relates generally to an apparatus for mounting visible images to valve stems of inflatable tires, and more specifically to the mounting of pictures within such devices as well as the use of such devices as reflectors for both cosmetic and safety reasons.

DESCRIPTION OF THE PRIOR ART

As traffic in our society among both motorist and the various cyclist who often share their roadways becomes more and more congested, there arises an ever increasing need for increased safety. This can be attained by making vehicles more noticeable through the use of various reflectors. Conventional reflectors, though useful, have their limitations. A greater degree of effectiveness can be achieved through the use of active reflectors, that is to say, those that move about on the vehicle itself. One way to attain an active reflector is to mount the reflector to the outer part of the wheel, more specifically to the valve stem. There have been attempts in the past to accomplish this result. One such attempt is described in the patent "Signal Device for Vehicles" issued Aug. 14, 1945, to C. W. Thornton. Another is described in the patent "Light Reflectors" issued on Sep. 5, 1981 to Dragan Vukadinovic. The inventions disclosed in these patents are insufficient in several areas such as durability, adequate light reflection at low light levels, and safety. It is also noted that an apparatus suitable for mounting a reflector on a valve stem could also be useful in mounting other ornamental objects, such as logos or small pictures. The previously mentioned patents make no disclosures in this area at all. It is therefore respectfully submitted that the invention as described below will fulfill the purpose of providing an apparatus suitable as a valve stem mounted reflector of superior design, as well as an apparatus suitable for mounting ornament objects.

SUMMARY OF THE INVENTION

The invention as set forth below comprises generally an apparatus for mounting visual images such as small pictures or retro-reflective tape to the valve stems of vehicle tires, and more specifically to a valve stem mounted reflector. For the purpose of simplicity, the following description will be that of a valve stem mounted reflector using a piece of retro reflective tape as the visual image, keeping in mind that the retro-reflective tape may be replaced with a picture, or logo for strictly ornamental use, and that retro-reflective tape with pictures printed upon the reflective surface is available.

The body of the reflector comprises a generally cone or bulb shaped casting whose base is slightly dome shaped. The pointed end of the cone shaped casting is equipped with a cylinder shaped cavity or bore. The base of the cone shaped casting is covered with a piece of retro-reflective tape. The tape, in turn, is covered by a lens that is so shaped as to conform to the shape of the base. The perimeter of the base is encircled by a ridge. The perimeter of the lens also has a ridge enabling the lens to be snapped over the base securely. The lens both protects the retro-reflective tape and holds it firmly in place. The use of the lens allows the employment of retro-reflective tape with or without an adhesive back. The interior surface of the lens is equipped with a plurality of vertical serrations adjacent to the ridge. When the lens is snapped over the base, these serrations put pressure on the base, holding the retro-reflective tape in place, and preventing the lens from turning as the reflector is screwed onto the valve stem. The piece of retro reflective tape is sufficiently large in diameter to cover the ridge encircling the perimeter of the base. As the lens is snapped over the base, the tape is pressed between the ridges of the lens and base. The sandwiched effect between the lens and base allows the tape to act as a gasket, thus sealing out dirt and moisture. The use of the removable lens also allows for the interchanging of images when the apparatus is used for strictly ornamental purposes, and also preserved the brilliance of the retro-reflective tape when used as a reflector. If interchanging of images is not desired, the lens may be glued or otherwise permanently bonded to the base.

The body of the reflector is mounted to the valve stem by inserting the threaded end of the valve stem into the cavity or bore. In the previously disclosed patents, the reflectors were equipped with threads corresponding to the threads that are on valve stems. This produces a serious safety hazard in that the reflectors are two rigidly fastened to the valve stem. If the hubcap of a wheel equipped with such a reflector were to be jarred loose and thrown from the wheel, the reflector would be caught and taken away with the hub cap. In all probability, the valve stem itself would be ripped from the wheel causing a sudden, dramatic loss of air pressure within the wheel's tire. This could result in a serious accident. To avoid this problem, the present invention suggests that the reflector be mounted to the valve stem in a less rigid fashion, enabling the reflector to be easily separated from the valve stem during an emergency, yet cling firmly to the valve stem during ordinary use. One method suggested by the present invention to accomplish this is to size the bore slightly smaller than the threaded end of the valve stem, and to form the body of the reflector with a sufficiently soft material as to allow the interior wall of the bore to be self threaded as the reflector is screwed onto the valve stem. With proper sizing and material use, the threads would be stripped away easily in an emergency, yet hold firm under ordinary use.

Another method of accomplishing the desired safety release feature would be to equip the interior walls of the bore with a plurality of serrations. These saw-tooth or thorn like formations, being formed toward the interior of the bore, would latch themselves to the threads of the valve stem as the threaded end of the valve stem was inserted into the bore. Using the serrated bore method of mounting, the reflector could as well be fastened to the valve stem by pressing the valve stem cap into the serrated bore. The points of the serrations would dig slightly into the surface of the valve stem cap. This would mount the reflector to the valve stem in such a way as to allow the reflector to be screwed off the valve stem without damage to the serations within the bore. The bore could also be formed deeply enough for the serations to fasten the reflector to the synthetic rubber sides of the valve stem itself. During an emergency as described previously, the serations would be partially striped away, allowing the reflector to be pulled from the valve stem without damage to the wheel. Yet another way to accomplish this safety feature would be to so shape the bore as to adhere to the valve stem by means of a suction.

BRIEF DESCRIPTION OF THE DRAWINGS

FIG. 1 is a cutaway view of a portion of a wheel, showing the tire, the valve stem, and the reflector mounted to the valve stem.

FIG. 2 is a side elevation view of a valve stem, with cap, and the reflector in position for installation.

FIG. 3 is a side elevation cut away-explosion view of the reflector showing the serrations, the retro-reflective tape and the lens.

DETAILED DESCRIPTION OF THE INVENTION

Figure 4:
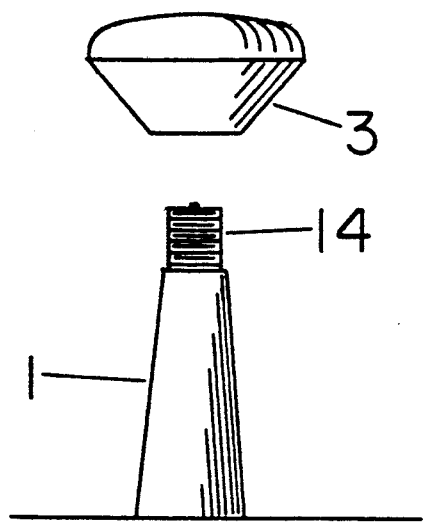
FIG. 4 is a side elevation view of a valve stem, without cap, and the reflector ready for installation.
Figure 5:
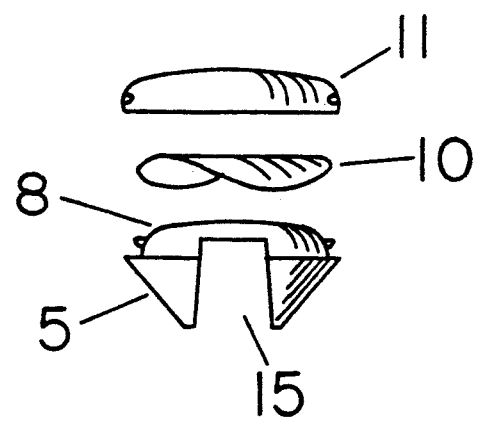
FIG. 5 is a side elevation cut away-explosion view of the reflector showing the lens, the retro-reflective tape and the bore without serrations.

Referring to the drawings, and more specifically to figure one, it can be seen that the valve stem 1 of a tire 2 is equipped with the reflector 3.

Referring to figure two, it can be seen that the reflector 3 is in position to be mounted to the valve stem cap 4 of a valve stem 1.

Referring to figure three, it can be seen that the body 5 of the reflector is equipped with a bore 6, whose interior walls are equipped with a plurality of serrations 7. It can also be seen that the base 8 of the body is generally in the shape of a flattened dome, equipped with a ridge 9 encircling the parameter of the base 8. The parameter of the base 8 is slightly smaller in diameter than the diameter of the body 5 adjacent to the base 8. It can also be seen that a circular piece of retro reflective tape 10 sufficient in area to cover the base 8 and to slightly overlap the ridge 9 is in position to be fastened to the base 8. A lens 11 is also shown. The lens 11 is in the general shape of the base 8. The parameter of the lens is curved to fit to the dome shaped base 8, thus forming a collar shape at its outer edge. It can also be seen that the lens 11 is equipped with a ridge 12 encircling the interior surface of its collar shaped perimeter, and that the lens 11 is in position to be fastened onto the base 8. When the lens 11 is pressed downward over the base 8, the ridge 12, which is formed to the interior of the collar shaped perimeter of the lens 11 is snapped over the ridge 9 which encircles the perimeter of the base 8. When this is accomplished, the outer edges of the retro-reflective tape 10 are sandwiched between the ridge 9 of the base 8 and the ridge 12 of the lens 11, forming a gasket like barrier to dirt and moisture. The fact that the diameter of the base 8 is slightly smaller than the diameter of the body 5 (the difference in diameters corresponding to the thickness of the lens 11) allows a smooth, level fit between the lens 11 and the body 5. It can also be seen that the lens 11 is equipped with a plurality of vertical serrations 13 adjacent to the ridge 12. When the lens 11 is snapped over the base 8, the serrations 13 put pressure on the curved portion of the base 8. This helps to hold the retro-reflective tape 10 in place and keeps the lens 11 from spinning as the reflector cap assembly is screwed on and off of the valve stem.

Referring to figure four, it can be seen that a reflector 3 is in position to be self threaded onto the threaded end 14 of a valve stem 1.

Referring to Figure five, it can be seen that the body 5 of the reflector is equipped with a self threading bore 15. Also shown is a piece of retro-reflective tape 10 and a lens 11 in position to be installed, in the manner previously described, to the base 8 of the body 5.

CONCLUSION

The above described reflector offers many advantages over previous designs. For example, the use of retro-reflective tape as a reflective element gives a much brighter reflection of light, especially at low light levels, than simple the cut glass or plastic faceted reflectors used in previous designs. This enhances both the safety and cosmetic appearance of the reflectors. The use of a lens to cover the reflective element prolongs the life and brilliance of the reflector. The dome shaped design provides for a much greater reflective area than the previous faceted designs. The firm, yet forcible removable mounting design greatly enhances the safety of the reflector over previous designs. In addition to this, the removable lens design enables a similarly shaped apparatus to be used for mounting other ornamental objects, such as logos or pictures, to inflatable tire valve stems. It is therefore respectfully submitted that the invention as set forth above is new, useful, non-obvious and merits patent protection.

I claim:

1. An apparatus for mounting visible images or an image producing element to an inflatable tire valve stem comprising a body, a means for mounting said body to said valve stem, and a lens; said lens suitably attached to said body as to cover, protect and retain said images or image producing element to said body; said images or image producing element further comprising a reflective material, said reflective material further comprising retro-reflective tape.

2. A valve stem mounted reflector comprising a body, a means for mounting said body to said valve stem, a reflective element, and a lens; said lens suitably attached to said body as to cover, protect and retain said reflective element to said body; wherein said reflective element comprises retro-reflective tape.

3. A valve stem mounted reflector comprising a body, a means for mounting said body to said valve stem, a reflective element, and a lens, said lens suitably attached to said body as to cover, protect and retain said reflective element to said body; wherein said body further comprises a generally cone or bulb shaped element, having a base, a sloped side area and a tip; said base having a center surface and an extreme outer surface, said center surface being generally flat, and said extreme outer surface being curved toward said sloped side area, so as to form the base in a generally dome shape, the diameter of said extreme outer surface being slightly smaller than the diameter of said sloped side area adjacent to said extreme outer surface, said extreme outer surface further comprising a ridge, said ridge encircling said base adjacent to said sloped side area, and wherein said lens comprises a center surface, and an outer surface, said center surface being generally flat, and said outer surface being curved so as to form a collar, so as to conform to said base of said cone shaped element, said collar having an inner and outer surface, and an edge, said collar further comprising a ridge formed to said inner surface, adjacent to said edge, corresponding to said ridge on said base, thus allowing said lens to be snapped over said base of said generally cone shaped element, thus protecting and retaining said reflective element to said base of said reflector.

4. a vlave stem mounted reflector as recited in claim 3, wherein said lens further comprises a plurality of vertical serrations, said serrations formed to said inner surface of said collar, adjacent and perpendicular to said ridge, so as to exert static pressure upon said base as said lense is mounted to said base.

5. a valve stem mounted reflector as recited in claim 3, wherein said reflective element comprises a disk of retro reflective tape, said disk of retro-reflective tape being sufficient in diameter to be sandwiched between said ridge of said base and said ridge of said lens, so as to form a gasket.

6. a valve stem mounted reflector as recited in claim 3, wherein said valve stem further comprises an end having threads, a cap and sides, and wherein said means for mounting said body to said valve stem comprises a cylinder shaped bore, said bore further comprising an interior wall, said bore being formed at said tip, upward toward said base.

7. a valve stem mounted reflector as recited in claim 6, wherein said bore is suitably sized and formed of a suitable material so as to allow said interior wall of said bore to be self threaded as said body is screwed onto said end having threads of said valve stem, thus affixing said apparatus to said valve stem.

8. a valve stem mounted reflector as recited in claim 6, wherein said bore further comprises a plurality of sharp pointed prongs, or serrations, said serrations being formed to said interior wall of said bore, said serrations being pointed inward toward said base so as to allow said serrations to latch to said threads, cut into said sides of said valve stem, or to cut into said cap, thus affixing said apparatus to said valve stem.

9. a signal accessory for use on wheels with air valve stem cap assemblies, said signal accessory comprising, a bulb like casting, said casting having a top side and a bottom side, said top side being substantially covered with retro-reflective reflectors, said bottom side comprising a member with a bore, said bore being interiorly serrated, said bore being sized such that the interior serrations, in combination with the bore, will frictionally engage the surfaces of said air valve stem cap assemby when said assembly is inserted into said bore.

* * * * *